United States Patent [19]

Leitch

[11] Patent Number: 5,038,403
[45] Date of Patent: Aug. 6, 1991

[54] SIMULCAST SYSTEM WITH MINIMAL DELAY DISPERSION AND OPTIMAL POWER CONTOURING

[75] Inventor: Clifford D. Leitch, Coral Springs, Fla.

[73] Assignee: Motorola, Inc., Schaumburg, Ill.

[21] Appl. No.: 649,134

[22] Filed: Jan. 29, 1991

Related U.S. Application Data

[63] Continuation-in-part of Ser. No. 462,953, Jan. 8, 1990, abandoned, which is a continuation of Ser. No. 156,264, Feb. 16, 1988, abandoned, which is a continuation-in-part of Ser. No. 874,767, Jun. 16, 1986, abandoned.

[51] Int. Cl.⁵ ............................................... H04B 1/10
[52] U.S. Cl. .......................................... 455/51; 455/56
[58] Field of Search ....................... 455/16, 51, 53, 56, 455/58, 33; 375/107; 379/59-63; 370/108; 340/825.44

[56] References Cited

U.S. PATENT DOCUMENTS

| | | | |
|---|---|---|---|
| 4,255,814 | 3/1981 | Osborn | 455/53 |
| 4,317,220 | 2/1982 | Martin | 455/58 |
| 4,470,141 | 9/1984 | Takada | 455/51 |
| 4,472,802 | 9/1984 | Pin et al. | 370/108 |
| 4,475,246 | 10/1984 | Batauala et al. | 455/51 |
| 4,696,051 | 9/1987 | Breeden | 455/33 |
| 4,696,052 | 9/1987 | Breeden | 455/51 |
| 4,718,109 | 1/1988 | Breeden et al. | 455/51 |

Primary Examiner—Curtis Kuntz
Attorney, Agent, or Firm—Gregg Rasor; Thomas G. Berry; Vincent B. Ingrassia

[57] ABSTRACT

A simulcast system is provided which includes a primary transmitting station surrounded by first and second rings of secondary or simulcast transmitting stations. Communication links are provided to link the primary transmitting station with the secondary stations. Respecting time delay circuits are provided in the links such that the secondary stations retransmit the information signal from the respective links at substantially the same time as the primary information signal from the primary transmitter arrives at the respective secondary transmitter.

12 Claims, 5 Drawing Sheets

SIMULCAST SYSTEM WITH MINIMAL DELAY DISPERSION AND OPTIMAL POWER CONTOURING

This is a continuation-in-part of application Ser. No. 462,953 filed 1/8/90, now abandoned, which is a continuation of application Ser. No. 156,264 filed 2/16/88, now abandoned, which is a continuation-in-part of application Ser. No. 874,767 filed 6/16/86, now abandoned.

BACKGROUND OF THE INVENTION

This invention relates to radio frequency signalling systems. More particularly, the invention relates to simulcast radio frequency signalling systems and the problem of delay dispersion.

In paging and other radio communications systems, one primary transmitter often does not give sufficient coverage over a designated geographic area. In these instances, simulcast transmitters are used to fill in areas where coverage by the primary transmitter is insufficient or otherwise marginal. For example, FIG. 1A shows a conventional simulcast paging system which includes a primary transmitter 10 and a secondary transmitter 20. Transmitter 10 transmits information signals, either digital or analog, which include selective calling signals and message signals. These information signals are typically provided to secondary transmitter 20 by a telephone wire link 30 which connects primary transmitter 10 to secondary transmitter 20. In the conventional simulcast paging system of FIG. 1A, the information signals are transmitted simultaneously by the primary and secondary stations. Since there is a finite time delay associated with wire link 30 between the time at which the information signals from primary transmitter 10 enter link 30 and the time such information signals arrive at secondary transmitter 20, it is necessary to provide a time delay circuit 12 at the output of primary transmitter 10 such that the primary station antenna 14 and secondary station antenna 24 radiate the same information signals at the same time. For such simultaneous transmission to occur, the time delay exhibited by time delay circuit 12 is selected to be equal to the propagation delay of link 30.

FIG. 1B is a representation of a typical radiation pattern exhibited by the simulcast system of FIG. 1A. Primary transmitter 10 and secondary transmitter 20 are separated by a distance of 5 miles in this example. Primary transmitter 10 generates a radiation pattern 40 which covers primary coverage area 45. Secondary transmitter 20 generates a radiation pattern 50 which covers a secondary coverage area 55. Primary coverage area 45 and secondary area 55 overlap in overlap coverage area 60 in which signals from both primary transmitter 10 and secondary transmitter 20 are present. Depending on terrain and other propagation factors, the primary signal from the primary transmitter 10 will also be present with significant signal strengths in various portions of the secondary coverage area 55. This can cause interference problems for a receiver in the secondary coverage area 55 when such receiver moves from a first location 62 to a second location 64 which is shadowed from secondary transmitter 20.

It is seen that there are two possible signal paths over which information signals can reach a receiver located at second location 64. That is, under most conditions, the secondary signal would reach the receiver at location 64 over a path B which is the line between secondary transmitter 20 and location 64, a distance of approximately 2 miles in this example. However, under the shadow conditions described above, it is likely that information signals from the primary transmitter 10 will reach a receiver located at location 64 directly over a path A, which is the line between primary transmitter 10 and location 64, a distance of approximately 6 miles in this example.

Now continuing this example with more detail, assume that primary transmitter 10 is transmitting digital paging signals and that secondary transmitter 20 is simulcasting such digital paging signals. As per the system arrangement of FIG. 1A, both primary antenna 14 and secondary antenna 24 radiate information bits in sync with each other. Generally, receivers in the primary coverage area 45 are synchronized to primary transmitter 10 and receivers in the secondary coverage area 55 are synchronized to the secondary transmitter 20. If a receiver is located in the secondary coverage area 55 at an arbitrary first location 62 at which reception of the digital paging signals from the secondary transmitter 20 is relatively strong, then the receiver receives the secondary signal satisfactorily. If, however, the receiver is moved from such first location 62 to a second location 64 in the secondary coverage area 55 at which the secondary signal is shadowed, then the primary signal over path A may actually be stronger than the secondary signal at such second location 64 over path B. In this instance, the receiver will lose the secondary signal and, instead, receive the primary signal. If the particular digital paging system has a relatively low bit rate, for example a rate in the neighborhood of 600 bits per second (BPS), then it is likely that the receiver would not lose sync as it loses the secondary signal and acquires the primary signal. At such slow bit rates the propagation delay difference between the longer path A (6 miles) and the shorter path B (2 miles) is not a significant portion of a bit length. However, as the data rate is increased, for example to 10,000 through 20,000 BPS and above, then the propagation delay difference between the longer path A and the shorter path B is a substantial portion of a bit length. This effect is referred to as delay dispersion. (Delay dispersion relates to the difference in time delay between two or more components of a radio signal which arrive at a receiver via paths of unequal length.) Thus, with such higher data rates, when a receiver passes from first location 62 to a shadowed second location 64 in the secondary coverage area 55, it is possible that the receiver will experience delay dispersion and lose sync. When the receiver loses sync, valuable information signals are lost and cannot be recovered. Even if the receiver does not lose sync, under these delay dispersion conditions, the receiver may still experience "simulcast distortion" which causes bit errors in the reception of digital transmissions and distortion in terms of lessened intelligibility in analog or voice transmissions.

Contemporary simulcast systems suffer inter-symbol interference of higher baud rate signalling information when the radio frequency signal levels are close in amplitude (e.g., the receiver is in a "non-captured" state) and the time difference (differential delay) approaches one-half a symbol time period. This interference prohibits successful decoding of these higher baud rates. Many approaches have been tried to alleviate this problem, the most common one being to locate sites closer to each other. Regrettably, this solution does not offer an economical or reliable technical solution to the problem because as the differential delay increases, the difference in average signal levels required for capture and reliable decoding also increases. Thus, as more sites are added, the complexity of the non-capture signal overlapping and phasing requirements increase, thereby negatively impacting system performance and significantly increasing the overall system cost.

BRIEF SUMMARY OF THE INVENTION

One object of the present invention is to provide a simulcast system which reduces the likelihood of a receiver in a simulcast coverage area of losing sync when the receiver passes into an area which is shadowed from the transmissions of the simulcast transmitter.

Another object of the present invention is to provide a simulcast system which is capable of high data rates.

Another object of the invention is to provide a simulcast system with minimal delay dispersion.

In one embodiment of the invention, a simulcast radio communications system is provided which includes an information signal source for providing an information signal and a plurality of n transmitters, situated in a corresponding plurality of different locations, for retransmitting said information signal. The system further includes a plurality of n communication links respectively coupled between the source and each of the plurality of transmitters, for providing the information signal to the plurality of transmitters. Each of the links exhibiting a respective propagation delay A plurality of n time delay circuits are respectively situated in series with each of the communications links. One of the transmitters is designated a primary transmitter which transmits the information signal to a primary coverage area thus generating a transmitted primary information signal. The remaining transmitters are designated secondary transmitters and includes directional antennas coupled thereto such that these remaining transmitters radiate minimal radio energy toward the primary transmitter. The time delays exhibited by the time delay circuits are selected such that the secondary transmitters retransmit the information signal from the respective links at substantially the same time as the transmitted primary information signal from the central transmitter arrives at the respective secondary transmitters.

The features of the invention believed to be novel are specifically set forth in the appended claims. However, the invention itself, both as to its structure and method of operation, may best be understood by referring to the following description and the accompanying drawings.

DETAILED DESCRIPTION OF THE INVENTION

Figure 2:
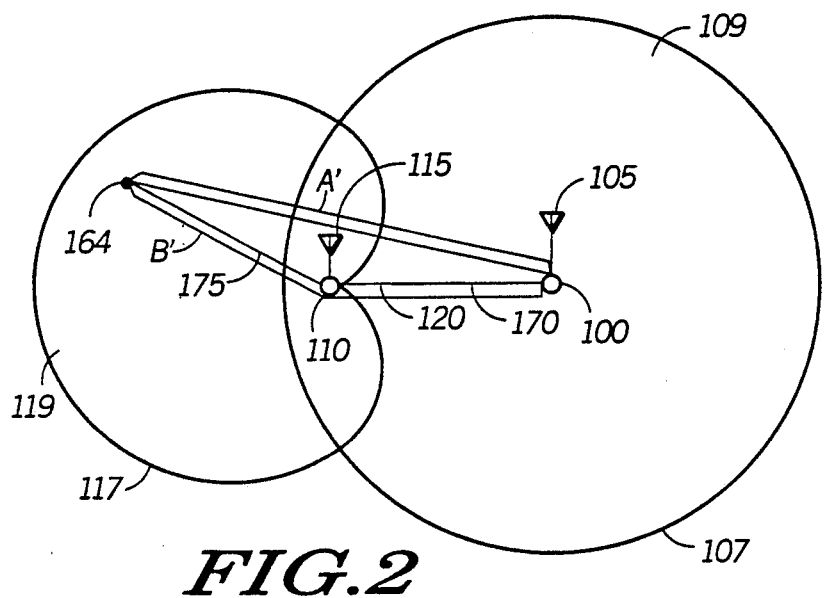
FIG. 2 is a block diagram a simplified version of the simulcast system of the invention including an approximate radiation pattern of such simulcast system.

Turning now to FIG. 2, one embodiment of the radio communications system of the present invention is shown as including a primary transmitter 100. Primary transmitter 100 transmits information signals modulated on a radio frequency carrier signal. For purposes of this particular example, the information signals transmitted by primary transmitter 100 are digital paging signals modulated on a radio frequency carrier signal, although those skilled in the art will appreciate that the invention applies to other types of digital signals and analog information signals as well.

Primary transmitter 100 is coupled to an antenna 105 which radiates the radio frequency signals generated by primary transmitter 100, such signals being hereinafter referred to primary signals. In this example, antenna 105 is a substantially omnidirectional antenna which generates a radiation pattern 107 as shown in FIG. 2 so as to radiate primary signals in a primary coverage area 109. Antennas other than omnidirectional antennas may be used as antenna 105 provided that the selected antenna generates a radiation pattern appropriately shaped to cover the shape of the primary coverage area which may itself vary according to the particular application.

The information signals from primary transmitter 100 are provided to a secondary transmitter 110 situated distant from the primary transmitter via a point to point microwave radio link 120 therebetween. Such information signals travel over respective link paths and will hereinafter be referred to as "microwave link information signals" in contrast to the information signals which are transmitted by primary transmitter 100 via antenna 105 to primary coverage 109, such signals being hereinafter referred to as "primary information signals". It is noted that the "microwave link information signals" and the "primary information signals" include the same signal information. Microwave link 120 transmits on a frequency other than that on which primary transmitter 100 and secondary transmitter 110 transmit.

Upon arrival at secondary transmitter 110, the "microwave link information signals" from primary transmitter 100 are retransmitted, that is simulcasted, by an antenna 115 coupled to transmitter 110. Delay circuits (described later in the discussion of FIG. 4) are incorporated in the communications link paths such that, each bit of the "microwave link information signals" is transmitted or simulcast by the secondary transmitter 110 at substantially the same time as the corresponding bit of the "primary information signals" arrives at the secondary transmitter site after being transmitted by the primary transmitter 100.

Antenna 115 of secondary transmitter 110 is a directional antenna which generates a radiation pattern 117 aimed substantially away from primary transmitter 100 and primary coverage area 109. In this manner, the secondary signals transmitted by secondary transmitter 110 are radiated into the secondary coverage area 119 without substantial radiation into the majority of the primary coverage area 109. Thus, interference by the secondary signals with the primary signals in the primary coverage area 109 is substantially avoided. An example of one antenna which could be employed as directional antenna 115 is an antenna which exhibits a cardioid radiation pattern although other directional antennas are usable as antenna 115 as long as the selected antenna can be aimed so as to radiate little radio frequency energy in the direction of primary transmitter 100. For example, a substantially unidirectional antenna is usable as antenna 115.

To better understand the operation of the invention in minimizing the undesirable effects of delay dispersion, assume that a location 164 exists in secondary coverage area 119, such location 164 being shadowed from the secondary signals transmitted by secondary transmitter 110. Secondary transmitter 110 is separated from primary transmitter 100 by a distance of 5 miles. Under these conditions, it is seen that it is possible for information signals to reach a receiver at location 164 by travelling along two different signal paths, namely path A' and path B'. Path A' is the direct signal path between the primary transmitter 100 and location 164. In this particular example, path A' has a length of approximately 10.8 miles.

In this example, path B' is defined as the simulcast signal path and includes a segment 170, which represents the distance the information signals must travel over the microwave link 120, and a segment 175 which represents the distance the simulcasted information signal from secondary transmitter 110 must travel to reach location 164. For purposes of this example, segments 170 and 175 have an angle of approximately 150 degrees therebetween as shown in FIG. 2. Segment 170 has a length of 5 miles and segment 175 has a length of approximately 6.6 miles. Thus, the total length of path B' is the summation of the lengths of segments 170 and 175, which is approximately 11.6 miles.

Figure 1A:
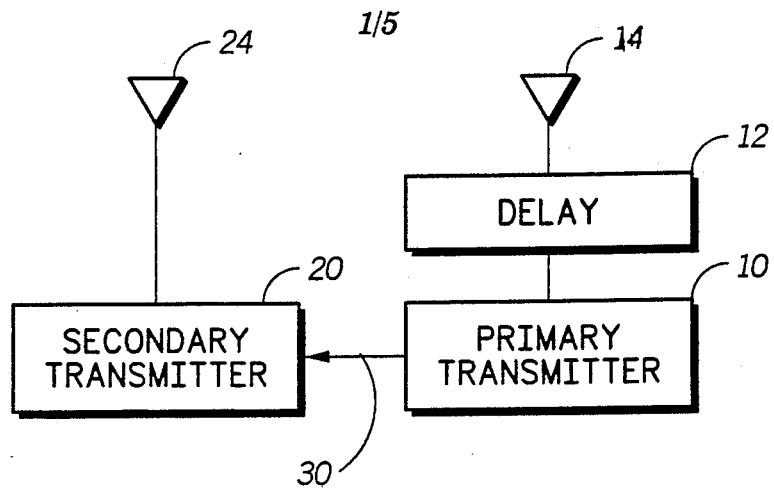
FIG. 1A is a block diagram of a conventional simulcast system.
Figure 1B:
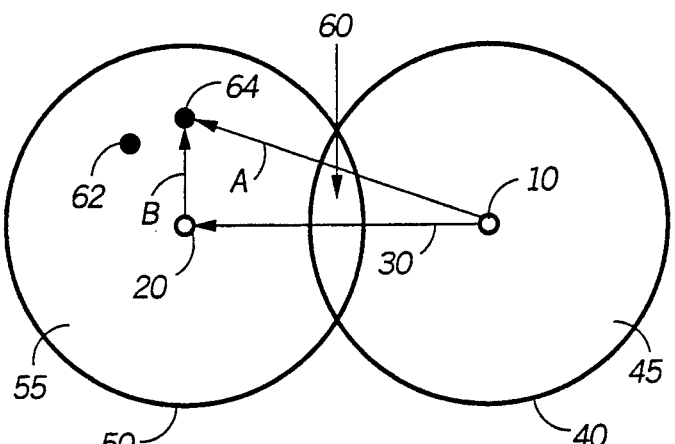
FIG. 1B is the radiation pattern of the simulcast system of FIG. 1A.

It is noted that it takes a finite and different amount of time for the primary signal to travel over path A' than for the secondary signal to travel over path B'. In the present example which employs the simulcast communications system of the invention, the apparent time delay difference as experienced at location 164 is the time delay of path B' minus the path delay of path A'. Thus such time delay difference is the time delay equivalent to a distance of 0.8 miles (11.6 − 10.8 miles). This is a substantial improvement as compared with the conventional simulcast system example given in FIG. 1A which resulted in a path length difference between path A and path B of 4 miles. Under FIG. 1A conditions, a receiver passing into the shadow at location 64 would experience a shift in the timing of the incoming bits equal to the time equivalent of 4 miles, whereas under the FIG. 2 conditions of the invention the same receiver would experience only a minimal shift in the timing of the incoming bits equal to the time equivalent of 0.8 miles. (The term, "time equivalent of miles", refers to the amount of time it takes for a radio signal to travel the specified number of miles.)

Figure 3:
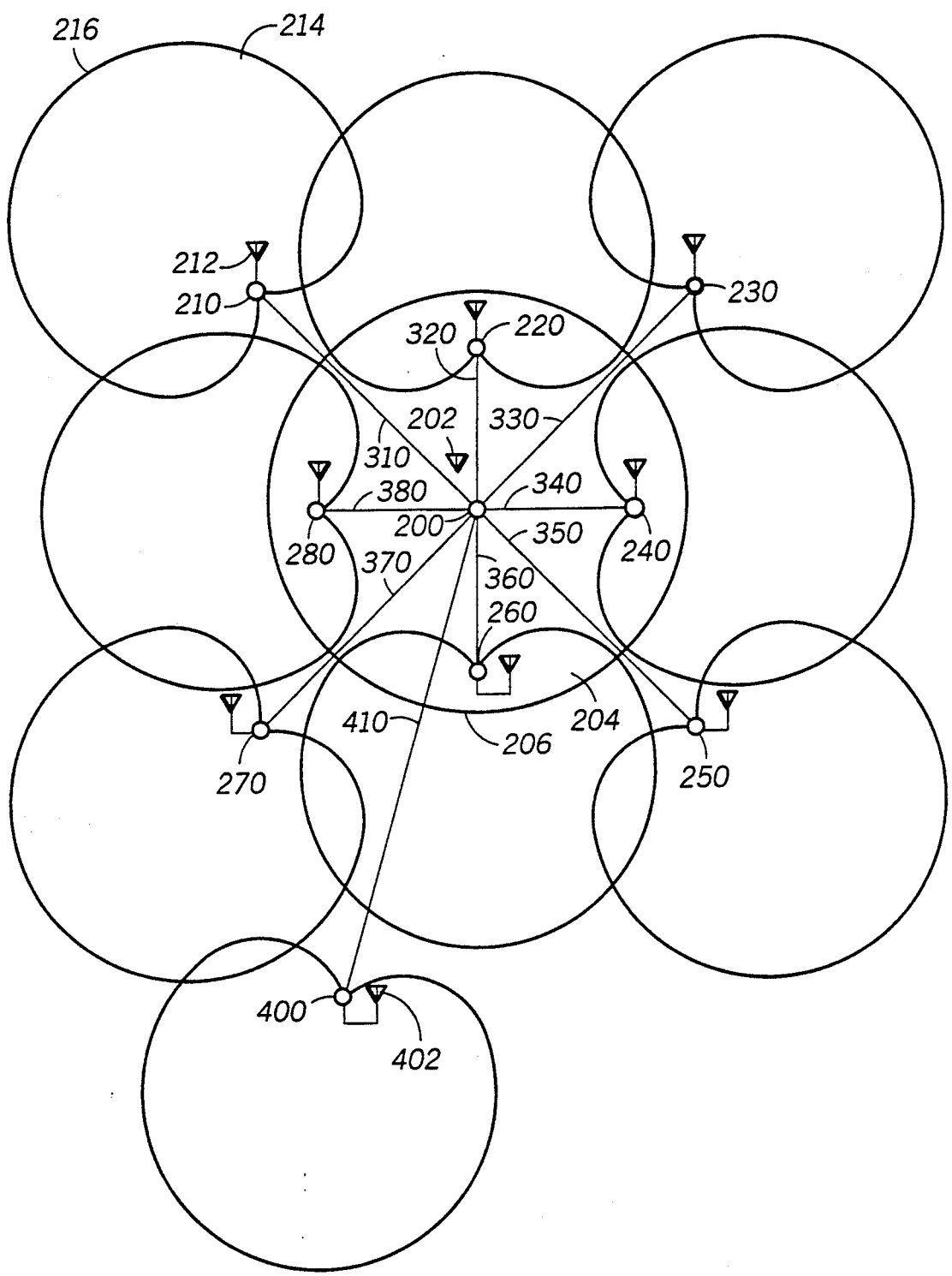
FIG. 3 is a representation of the simulcast system of the invention including an approximate radiation pattern of such simulcast system.

FIG. 3 is a representation of another embodiment of the simulcast communications system of the invention. The system of FIG. 3 is similar to the embodiment of FIG. 2, however, in the embodiment of FIG. 3, a plurality of secondary transmitters 210, 220, 230, 240, 250, 260, 270 and 280 are situated surrounding the coverage area 204 of a primary transmitter 200. In a manner similar to the system of FIG. 2 wherein the primary transmitter 100 was linked to secondary transmitter 110 via a microwave link 120 therebetween, primary transmitter 200 is linked to each of the plurality of secondary transmitters 210, 220, 230, 240, 250, 260, 270 and 280 via microwave radio links 310, 320, 330, 340, 350, 360, 370 and 380, respectively, therebetween. Secondary transmitters 210-280 provide fill-in coverage beyond the periphery of primary coverage area 204. Microwave radio links 310-380 transmit on a frequency other than that on which primary transmitter 200 and secondary transmitters 210-280 transmit.

In this example, primary transmitter 200 is coupled to an antenna 202 which radiates a generally omnidirectional radiation pattern so as to adequately cover the substantially circular primary coverage area 204. Of course, those skilled in the art will appreciate that the invention applies as well to primary coverage areas with geometries which are other than circular. Primary transmitter 200 transmits digital or analog information signals, hereinafter designated "primary information signals" to receivers (not shown) located within the primary coverage area 204. As discussed above, the periphery of coverage area 204 in this example is circular in nature and is hereinafter referred to as periphery 206.

The same information signals which are transmitted by primary transmitter 200 as "primary information signals" are simultaneously transmitted as "microwave link information signals" to secondary transmitters 210-280 via the respective microwave radio links 310-380. Microwave radio links 310-380 include a common microwave transmitter (not shown) situated at the primary transmitter 200 which transmits the microwave link information signals to the secondary transmitters 210-280. Microwave links 310-380 further include microwave receivers (not shown) located at each of the secondary transmitters 210-280 for receiving the microwave link information signals from the primary transmitter 200.

Each of secondary transmitters 210-280 retransmits the received microwave link information signals as "secondary information signals" on the same radio frequency as that on which the primary transmitter 200 transmits the primary information signals. Delay circuits (described later in the discussion of FIG. 4) are incorporated within the aforementioned links such tha retransmission or simulcasting of the link information signals by the secondary transmitters 210-280 occurs substantially simultaneously with the arrival of the primary information signal at the respective secondary transmitters 210-280.

For example, with respect to such simulcasting by secondary transmitter 210, primary transmitter 200 transmits a primary information signal and a microwave link information signal with the same signal information over microwave link 310 to secondary transmitter 210. The primary information signals travel outward from primary transmitter 200 across primary coverage area 204 at the same time the microwave link information signals are travelling out link 310 toward secondary transmitter 210. When such microwave link information signals reach secondary transmitter 210 they are retransmitted or simulcasted as secondary information signals at substantially the same time as the primary information signals are arriving at the site of the secondary transmitter 210. In this manner, assuming that digital information signals are employed in this example, the bits of the secondary information signals are transmitted by secondary transmitter 210 at the substantially the same time as the corresponding bits of the primary information signal arrive at the secondary coverage area 204. Thus, a particular bit of the secondary information signal is propagated throughout the secondary coverage area 204 at substantially the same time as the corresponding bit of the primary information signal is propagated throughout area 204. Since each bit of the secondary information signal substantially coincides in time with the corresponding bit of the primary information signal in secondary coverage area 204, a receiver in coverage area 204 is more likely to be able to maintain synchronization when it encounters a location where the secondary information signal is shadowed and the primary information signal instead is acquired. The discussion above with respect to secondary transmitter 210 applies as well to secondary transmitters 220-280.

Each of such transmitters 210-280 generates a radiation pattern beamed generally away from the primary transmitter 100 which is centrally situated among the plurality of secondary transmitters 210-280. The plurality of secondary transmitters 210-280 are situated so as to substantially surround the periphery 206 of coverage area 204 and so as to fill in areas beyond periphery 206 where coverage from the primary transmitter 200 is marginal. Those skilled in the art will appreciate that secondary transmitters may be situated at locations beyond the periphery 206 of the radiation pattern of primary transmitter 100 other than those locations shown in FIG. 2 depending on the specific needs for fill-in coverage in a particular simulcast system. (For purposes of this document, the term "beyond the periphery" is used to mean those locations which are more distant from primary transmitter 200 than the periphery 206 of primary coverage area 204 of primary transmitter 100.)

It is noted that, as seen in FIG. 3, the radiation patterns and coverage areas of the plurality of secondary transmitters 210-280 when considered together form a ring around the primary coverage area 204. Thus in subsequent discussion these secondary transmitters 210-280 will be referred to as first ring secondary transmitters or secondary transmitters of the first ring. It is understood that the first ring of secondary transmitters may be incomplete and the system would still be operational. For example, it possible that a large mountain, swamp or other significant geographic obstacle would be present in one of the secondary coverage areas shown in FIG. 3 and make travel in such region impossible. In that instance, it would not make sense to place a secondary transmitter at such location and the first ring of secondary transmitter would be left incomplete.

To obtain ever wider simulcast coverage than is possible with primary transmitter 200 and a single first ring of secondary transmitters 210-280, a second ring of simulcast transmitters, such as secondary transmitter 400, is situated so as to provide coverage beyond the coverage areas of the secondary transmitters of the first ring as shown in FIG. 3. While, for convenience, only one secondary transmitter 400 is shown in the second ring of FIG. 3, those skilled in the art will appreciate that, consistent with the invention, a plurality of such secondary transmitter are arranged with coverage areas forming such a second ring around the coverage areas of the first ring of secondary transmitters. Of course, for even greater coverage, third, fourth and up to N (wherein N is a integer number) rings could be situated in ring around ring relationship in the same manner that the second ring surrounds the first ring. It is also appreciated the first and second rings above need not be perfectly circular and that the word ring here is used to denote that the secondary transmitters are arranged in loops. In the example of FIG. 3, the first ring has the appearance of a somewhat square loop. It is noted that all possible secondary transmitter coverage areas around the loop need not be filled. The rings need only be filled with secondary transmitters sufficient to cover the secondary coverage areas which are necessary for the particular application.

As discussed above, the described ring-around-ring geometry of secondary transmitters can be extended outward from the primary transmitter indefinitely. However, the secondary transmitter geometry shown in FIG. 3 is given only by way of example. In fact, it is not necessary that the secondary transmitters be arranged an any particular geometry around the primary transmitter. Rather, what is necessary is that no matter where the location selected for a particular secondary transmitter with respect to the primary transmitter, the radiation pattern of each secondary transmitter must be aimed away from the primary transmitter. Consistent with the invention, a secondary transmitter may be placed essentially wherever additional fill-in coverage is desired, providing the teachings herein are followed.

A microwave link 410 provides the same microwave link information signals which are provided to the secondary transmitters of the first ring to the secondary transmitters of the second ring. Link 410 includes a microwave receiver (not shown) at secondary transmitter 400 for receiving the microwave information link signals from primary transmitter 200. Secondary transmitter 400 retransmits or simulcasts the information content of such microwave link information signals as secondary information signals at the same time the corresponding primary information signal reaches secondary transmitter 400. In this manner each bit of the secondary information signal in secondary coverage area 404 of the second ring occurs substantially at the same time as when the corresponding bit of the primary information signal reaches such secondary coverage area 404.

It is noted that a directional antenna 402 is coupled to secondary transmitter 400 such that the radiation pattern 406 of secondary transmitter 400 is aimed away from primary transmitter 200. This reduces interference by signals from the secondary transmitter 400 which may reach primary coverage area 204. It is also noted that each of the secondary stations in each of the rings is capable of continuously retransmitting or simulcasting the information signals it receives over the microwave link coupled to such secondary transmitter.

Consistent with the invention, it is also possible to use links other than the microwave radio links 310-380 which were used by way of example in the description above. For example, fiber optic cable, coaxial line and phone line could be employed as links 310-380. However, whatever the type of link selected, the link time delay from the primary transmitter to a particular secondary transmitter must be such that the secondary transmitter commences transmission of the secondary information signal (the information content of which comes over the link) substantially simultaneously with the arrival of the corresponding primary information signal at the secondary transmitter site. In the examples above in FIG. 2 and 3 wherein microwave radio links are employed as the communications link 120 (FIG. 2) and communications links 310-380 (FIG. 3), respective time delays (not shown) are provided to the microwave links to assure that the secondary information signal (derived from the link information signal) is retransmitted at substantially the same time as the corresponding primary information signal arrives at the particular secondary transmitter. In this manner, the secondary information signal from a particular secondary transmitter and the primary information signal from the primary transmitter spread throughout a particular secondary coverage area substantially in unison with each other.

Figure 4:
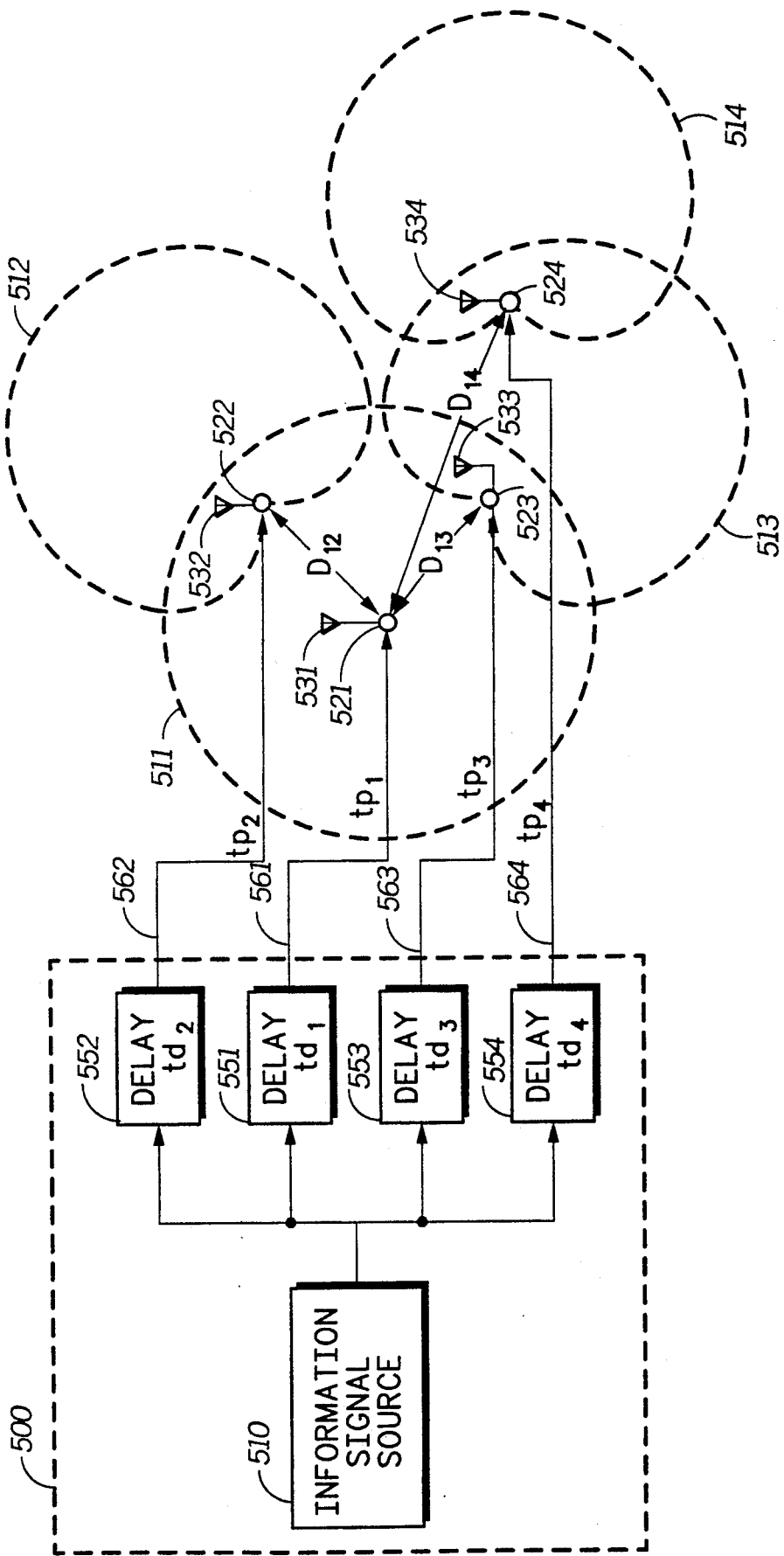
FIG. 4 a more detailed block diagram of the simulcast system of the invention including an approximate radiation pattern of such simulcast system.

FIG. 4 is a more detailed block diagram of the radio communications system of the present invention. The system of FIG. 4 includes a master control station 500. An information signal source 510, for example a paging terminal or other source of analog or digital information signals, is included in master control station 500. The output of source 510 is coupled to the respective inputs of "n" time delay circuits wherein "n" equals the number of time delay circuits and the number of transmitter coverage areas in the system. In the particular example of FIG. 4, four coverage areas 511, 512, 513 and 514 are shown although those skilled in the art will appreciate that the invention is not limited to a particular number of coverage areas. Each of coverage areas 511, 512, 513 and 514 includes a respective transmitter 521, 522, 523 and 524 therein. That is, n=1 corresponds to coverage area 511 and transmitter 521, n=2 corresponds to coverage area 512 and transmitter 522, n=3 corresponds to coverage area 513 and transmitter 523, n=4 corresponds to coverage area 514 and transmitter 524. Transmitters 521, 522, 523 and 524 are coupled to antennas 531, 532, 533 and 534, respectively. In this particular example, coverage area 511 is designated the primary coverage area and exhibits a substantially circular shape. Thus, antenna 531 is an omnidirectional antenna to permit transmitter 521 to cover area 511. Antennas with radiation patterns other than omnidirectional may be employed as antenna 531 depending on the selected shape of the desired coverage area 511. The remaining antennas 532, 533 and 534 in the secondary coverage areas 512, 513 and 514 exhibit radiation patterns which direct maximal signal energy away from the primary coverage area. That is the remaining antennas 532, 533 and 534 direct minimal signal energy toward the primary coverage area.

Each of transmitters 521, 522, 523 and 524 retransmits the information signal received from master control station 500 after injecting a predetermined amount of time delay, $td_n$, prior to retransmission. Since n=4 in this example, four delay circuits 551, 552, 553 and 554 are coupled to the output of information signal source 510 as shown in FIG. 4. Delay circuits 551, 552, 553 and 554 exhibit delays $td_1$, $td_2$, $td_3$, and $td_4$, respectively. The outputs of delay circuits 551, 552, 553 and 554 are coupled to the inputs of transmitters 521, 522, 523 and 524, respectively via respective communications links 561, 562, 563 and 564, such that delayed replicas of the information signal from signal source 510 are provided to such transmitters 521, 522, 523 and 524 for retransmission thereby.

As already discussed in the description of FIG. 2 and 3, communications links 561, 562, 563 and 564 may be microwave links, telephone links, optical links or other means of communicating the delayed information signal from master control 500 to the respective transmitters 521, 522, 523 and 524. Links 561, 562, 563 and 564 exhibit known propagation delays $tp_n$ of $tp_1$, $tp_2$, $tp_3$ and $tp_4$, respectively. In the microwave link embodiment, links 561, 562, 563 and 564 each include a link transmitter (not shown) at the end of the link which is coupled to master control 500 and a link receiver at the end of the link coupled to the respective transmitters 521, 522, 523 and 524. Other types of links, for example optical or telephone links, etc. will similarly include appropriate transmitters and receivers as well.

In each of the communications links 561, 562, 563 and 564, the respective time delay $td_n$ is selected such that $td_n + tp_n = K + D_{1n}/C$ wherein $D_{1n}$ equals the physical distance from transmitter 1 (transmitter 521) to transmitter n, wherein n corresponds to either transmitter 522, 523 or 524 as set forth above, C is the velocity of radio propagation (approximately $3 \times 10^8$ m/sec), and K is an arbitrary constant selected such that none of the delays $td_1$, $td_2$, $td_3$, and $td_4$, is required to be less than zero.

For example, if $tp_2 = 0.0001$ seconds, $D_{12} = 8000$ meters, and $K = 0.0002$ seconds, then $$td_2 = K + \frac{D_{12}}{C} - tp_2$$
$$td_2 = .000126667 \text{ sec.}$$

In this embodiment of the invention, the group delays through transmitters 521, 522, 523 and 524 and their associated feedlines (not shown) are assumed to be the same for all transmitters and antennas and thus need be considered in calculating the required delays, $td_n$. If the group delays of transmitters 521, 522, 523 and 524 are not all the same, then the propagation delay, $tp_n$, associated with each transmitter should be taken to be the sum of the respective communication link delay and the delay of the particular transmitter and its associated equipment.

It is noted that other embodiments of the invention are contemplated wherein the master control station may be co-located with one of the sites of transmitters 521, 522, 523 and 524. It is also noted that delay circuits 551, 552, 553 and 554 need not necessarily be located in master control station 500 at the master control ends of the respective communications links, but also may be located in series with the respective communications links at the transmitter ends (521, 522, 523 and 524) thereof.

Figure 5:
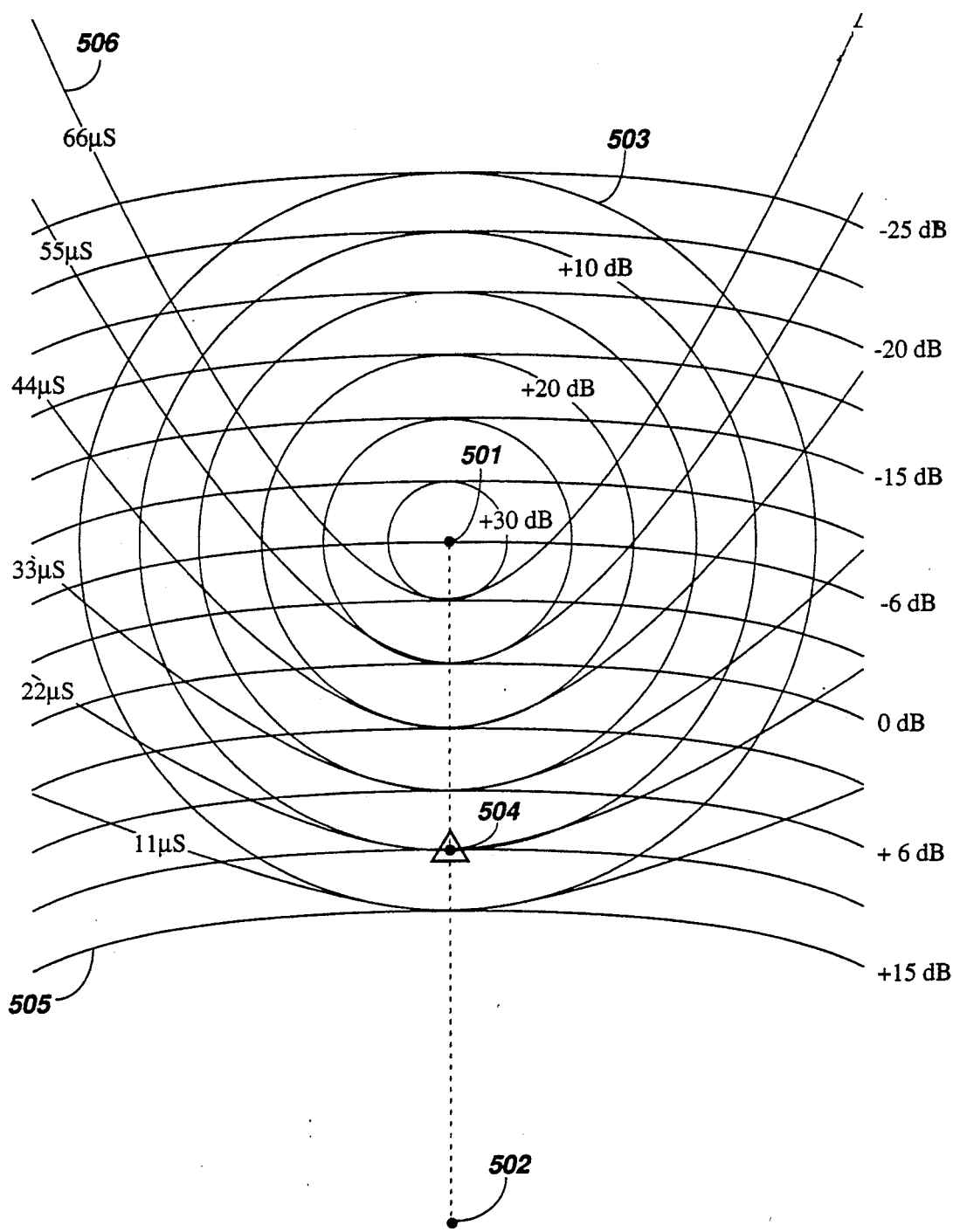
FIG. 5 is an illustration of the power and phasing (differential delay) contours in an optimally contoured simulcast system that provides maximum signal coverage in accordance with the present invention.

Referring to FIG. 5, the illustration shows a first transmitter site 501 and a second transmitter site 502, both being represented as ideal point source spherical wave radiators. In relation to the reference point 504, the distance to the second transmitter site 501 is much, much greater than the distance to the first transmitter site 501. The circles 503 and arcs of a large circle 505 are a two dimensional representation of the spherical waves that were launched from the first 501 and second 502 transmitter sites, respectively. The power present at any particular point in one of the spherical waves diminishes as the wavefront moves further from the transmitting source. The constant dispersion (differential) delay contours are shown by the hyperbolas 506. In considering the case shown in FIG. 5, an imaginary line is constructed from the center of the first transmitter site 501 to the center of the second transmitter site 502. The phase difference hyperbolas 506 shown are based on one mile circles so they would represent approximately 11 μs steps. Empirical data shows that a reasonably intelligible signal can be recovered at a BER of 1% if the average difference between two signals exceeds the receiver's capture ratio and the dominant signal is typically 20 dB above the equivalent of the receiver's 12 dB SINAD (signal+noise+distortion/noise+distortion) sensitivity point. By inspecting the difference in signal level with respect to the phasing hyperbolas, it is apparent that once the wavefront launched by the first transmitter site 501 passes the physical location of second transmitter site 502, that second transmitter site 502 will dominate and capture even when considering the phase difference. Furthermore, when the wavefront launched by the first transmitter site 501 is coincident with the physical location of the second transmitter site 502, the second transmitter site 502 "fires" and launches (retransmits) a directional wave that propagates in the same direction and with the same phase (along the central axis between the first and second transmission sites) as the wave launched from the first transmitter site 501. This extends the effective coverage area while producing minimal phase difference errors between the waves launched from the first and second transmitter sites.

As one of ordinary skill in the art will note, the example given in this embodiment represents an ideal situation for the sake of simplicity. In a real site planning environment, additional factors such as scattering, non-linear path loss, and fading should be considered to accurately implement the present invention. These and many more variables can be considered by using a computer program that accounts for the topography and composition of the site region being considered.

Using the data presented in FIG. 5, one can adjust the simulcast system to insure a digital bit error rate (BER) at a receiver of less than a desired amount. To achieve proper equalization across a desired geographical region, the differential delay between the sites is adjusted as discussed in reference to FIG. 2 and FIG. 3 to give no more than a 1% BER at the phasing point. Once the delay has been optimized, the power seen by the receiver located at any point between the sites is adjusted by altering the patterns of all antennae to create a situation where only one site can be detected as the stronger site in any critical overlap regions. This results in a simulcast system that has optimal characteristics in both phase equalization and power distribution, thus virtually eliminating the errors caused by improper capture and digital bit distortion.

Figure 6A:
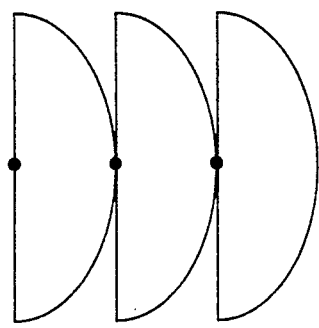
FIG. 6A is an illustration of a linear antenna array for use in accordance with the present invention.
Figure 6B:
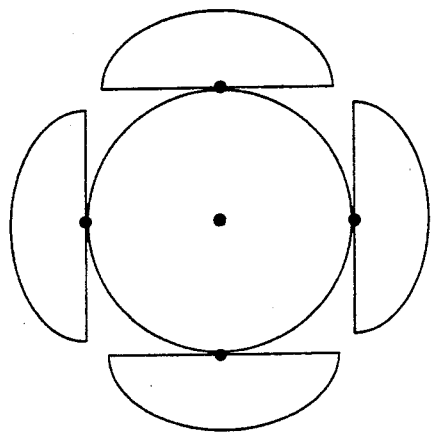
FIG. 6B is an illustration of an omni-directional central cell and directional peripheral cell antenna array for use in accordance with the present invention.
Figure 6C:
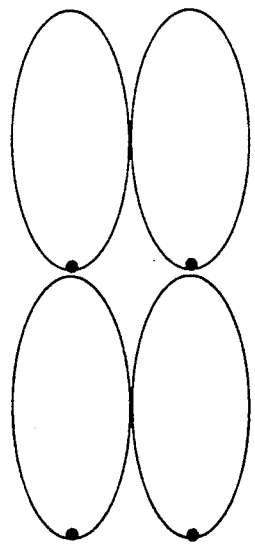
FIG. 6C is an illustration of a co-linear elliptical pattern antenna array for use in accordance with the present invention.

The radio frequency broadcasting pattern can be adjusted using a variety of methods for altering antenna patterns, including but not limited to: adding a reflector element, a director element, altering the antennae mechanical downtilt angle, or possibly changing the mounting height above the ground. FIGS. 6A, 6B, and 6C suggest a number of possible configurations for implementing the simulcast system in accordance with the present invention.

Referring to FIG. 6A, a first embodiment of an alternate antenna system shows a linear antenna array using a directional antennae that provides and expanded coverage area while preventing interference between adjacent transmitting sites.

Referring to FIG. 6B, a second embodiment of an alternate antenna system shows an omni-directional central cell and directional peripheral cell antenna array that provides an expanded coverage area while preventing interference between adjacent transmitting sites. This is probably the most common configuration used in setting up simulcast communication sites. It yields good coverage and can be constructed to have equal delays between the peripheral cells and the central cell.

Referring to FIG. 6C, a third embodiment of an alternate antenna system shows a co-linear elliptical pattern antenna array that provides an expanded coverage area while preventing interference between adjacent transmitting sites.

The foregoing describes an apparatus for simulcasting to a plurality of secondary coverage areas surrounding a primary coverage area. The invention provides a simulcast system which reduces the likelihood of a receiver in a secondary (simulcast) coverage area of losing sync when such receiver passes into an area which is shadowed from the secondary transmitter. The system is capable of high data rates while minimizing undesired delay dispersion.

While only certain preferred features of the invention have been shown by way of illustration, many modifications and changes will occur to those skilled in the art. It is, therefore, to be understood that the present claims are intended to cover all such modifications and changes which fall within the true spirit of the invention.

I claim:

1. A simulcast radio communication system comprising:
   an information signal source for providing an information signal;
   a first transmitter for transmitting said information signal to provide a transmitted information signal in a first transmission area;
   a plurality of secondary transmitters, substantially peripherally situated about said first transmission area, for retransmitting said information signal into respective secondary transmission areas;
   a plurality of communication links respectively coupled between said information signal source and each of said plurality of secondary transmitters, for providing said information signal to said plurality of secondary transmitters, each of said communication links exhibiting a respective propagation delay;
   a plurality of time delay circuits respectively situated in series with each of said communication links;
   said secondary transmitters having directional antennas coupled thereto such that said secondary transmitters radiate minimal energy toward said first transmission area, and
   the time delays exhibited by said time delay circuits being selected such that said secondary transmitters retransmit said information signal received from the respective communication links at substantially the same time as said transmitted information signal from said first transmitter arrives at the respective secondary transmitter.

2. The simulcast radio communications system of claim 1 wherein said time delay circuits are located at said information signal source.

3. The simulcast radio communications system of claim 1 wherein said time delay circuits are located at said plurality of secondary transmitters.

4. The radio communications system of claim 1 wherein said information signal is a digital signal.

5. The radio communications system of claim 1 wherein said information signal is an analog signal.

6. The radio communications system of claim 1 wherein said plurality of communication links comprise a microwave links.

7. The system of claim 1 wherein said first transmitter includes a substantially omnidirectional antenna coupled thereto.

8. A simulcast radio communication system, comprising:
- an information signal source for providing an information signal;
- first transmitting means for transmitting said information signal into a first transmission area to provide a first transmitted signal;
- at least one secondary transmitting means, situated at an approximate edge of said first transmission area, for re-transmitting a time delayed version of said information signal into secondary transmission areas that partially overlap said first transmission area; and
- a communication link, coupled between said information signal source and said secondary transmitting means, having a delay means for providing said delayed version of said information signal to said secondary transmitting means approximately when said first transmitted signal arrives at said secondary transmitting means such that said first and second transmitted signals arrive within the overlap region at substantially the same time.

9. A simulcast radio communication system, comprising:
- an information signal source for providing an information signal;
- first transmitting means for transmitting said information signal into a first transmission area to provide a first transmitted signal;
- a plurality of secondary transmitting means, situated at an approximate edge of said first transmission area, for re-transmitting a time delayed version of said information signal into secondary transmission areas that partially overlap said first transmission area to provide a second transmitted signal;
- a plurality of third transmitting means, situated at an approximate edge of said second transmission area, for re-transmitting a time delayed version of said information signal into third transmission areas that partially overlap said second transmission area;
- a plurality of communication links, coupled between said information signal source and at least one of said secondary transmitting means, each of said plurality of communication links having a delay means for providing said delayed version of said information signal to said secondary transmitting means approximately when said first transmitted signal arrives at said secondary transmitting means; and
- a plurality of communication links, coupled between said information signal source and at least one of said third transmitting means, each of said plurality of communication links having a delay means for providing said delayed version of said information signal to said third transmitting means approximately when said second transmitted signal arrives at said third transmitting means.

10. A method for simulcasting an information signal with minimal delay dispersion, comprising the steps of:
(a) transmitting an information signal from a first transmitter into a first transmission area to provide a first transmitted signal;
(b) sending a delayed version of said information signal to at least one secondary transmitter situated approximately on the periphery of said first transmission area;
(c) transmitting said delayed version of said information signal from a second transmitter at approximately the same time that said first transmitted signal arrives at said second transmitter to provide a second transmitted signal into secondary transmission areas each having a partial overlap region with said first transmission area such that said first and second transmitted signal arrive within said overlap region at substantially the same time.

11. A simulcast radio communication system, comprising:
- an information signal source for providing an information signal;
- first transmitting means having an antenna system and a radiation pattern associated therewith for transmitting the information signal into a first transmission area to provide a first transmitted signal;
- at least one secondary transmitting means having an antenna system and a radiation pattern associated therewith for re-transmitting a time delayed version of the information signal into secondary transmission areas that partially overlap said first transmission area; and
- a communication link, coupled between the information signal source and the secondary transmitting means, having a delay means for providing the time delayed version of the information signal to the secondary transmitting means for re-transmission at a time approximately when the first transmitted signal arrives at the secondary transmitting means and such that the first transmitted signal and re-transmitted time delayed version of the information signal arrive within an overlap region comprising at least a portion of the first and second transmission areas at substantially the same time.

12. A method for simulcasting an information signal with minimal delay dispersion and optimal radiated power contouring, comprising the steps of:
- transmitting the information signal from a first transmitter having an antenna system and a radiation pattern associated therewith into a first transmission area for providing a first transmitted signal;
- sending a time delayed version of the information signal to at least one secondary transmitter having an antenna system and a radiation pattern associated therewith; and
- re-transmitting the time delayed version of the information signal from the at least one secondary transmitter at a time approximately when the information signal arrives at the secondary transmitting means and such that the information signal and the re-transmitted time delayed version of the information signal arrive within an overlap region comprising at least a portion of the first and second transmission areas at substantially the same time.

* * * * *